United States Patent [19]

Aoki et al.

[11] Patent Number: 4,775,891
[45] Date of Patent: Oct. 4, 1988

[54] IMAGE DISPLAY USING LIQUID CRYSTAL DISPLAY PANEL

[75] Inventors: Tsuyoshi Aoki; Saburo Kobayashi; Minoru Usui; Ryota Odake, all of Tokyo, Japan

[73] Assignee: Casio Computer Co., Ltd., Tokyo, Japan

[21] Appl. No.: 769,002

[22] Filed: Aug. 23, 1985

[30] Foreign Application Priority Data

Aug. 31, 1984 [JP] Japan .................................. 59-181885
Apr. 10, 1985 [JP] Japan .................................. 60-75570

[51] Int. Cl.⁴ .......................... H04N 5/14; H04N 5/70
[52] U.S. Cl. .................................... 358/160; 340/784; 340/794
[58] Field of Search .............. 358/160, 166, 230, 241; 340/752, 753, 754, 794, 805, 784

[56] References Cited

U.S. PATENT DOCUMENTS 4,251,769  2/1981  Ewert ................................. 340/753
4,412,213  10/1983  Nishino ............................. 340/753
4,415,891  11/1983  Hay .................................... 340/753
4,481,511  11/1984  Hanmura et al. .................. 340/752

FOREIGN PATENT DOCUMENTS 3326517  1/1984  Fed. Rep. of Germany .
2051443  1/1981  United Kingdom .
2070308  9/1981  United Kingdom .
2124816  2/1984  United Kingdom .

OTHER PUBLICATIONS

Funkschau 1979, No. 8, pp. 427-430—15-cm-Flussigkristall-Flachbildschirm.

Primary Examiner—Tommy P. Chin
Attorney, Agent, or Firm—Frishauf, Holtz, Goodman & Woodward

[57] ABSTRACT

An image display apparatus having an A/D converter which samples a television signal a plurality of times in each horizontal effective display period and converts the sampled signal into digital data, and a gradation signal generator combines gradation signals produced in a plurality of horizontal effective display periods according to the digital data to produce a new gradation signal. An image display panel is driven for display according to the new gradation signal.

8 Claims, 15 Drawing Sheets

| | | | | E = 0 | | | E = 1 | | |
|---|---|---|---|---|---|---|---|---|---|
| O1 | O2 | O3 | O4 | D1 | D2 | D3 | D1 | D2 | D3 |
| 0 | 0 | 0 | 0 | 0 | 0 | 0 | 0 | 0 | 0 |
| 0 | 0 | 0 | 1 | 0 | 0 | 0 | 0 | 0 | 1 |
| 0 | 0 | 1 | 0 | 0 | 0 | 1 | 0 | 0 | 1 |
| 0 | 0 | 1 | 1 | 0 | 0 | 1 | 0 | 1 | 0 |
| 0 | 1 | 0 | 0 | 0 | 1 | 0 | 0 | 1 | 0 |
| 0 | 1 | 0 | 1 | 0 | 1 | 0 | 0 | 1 | 1 |
| 0 | 1 | 1 | 0 | 0 | 1 | 1 | 0 | 1 | 1 |
| 0 | 1 | 1 | 1 | 0 | 1 | 1 | 1 | 0 | 0 |
| 1 | 0 | 0 | 0 | 1 | 0 | 0 | 1 | 0 | 0 |
| 1 | 0 | 0 | 1 | 1 | 0 | 0 | 1 | 0 | 1 |
| 1 | 0 | 1 | 0 | 1 | 0 | 1 | 1 | 0 | 1 |
| 1 | 0 | 1 | 1 | 1 | 0 | 1 | 1 | 1 | 0 |
| 1 | 1 | 0 | 0 | 1 | 1 | 0 | 1 | 1 | 0 |
| 1 | 1 | 0 | 1 | 1 | 1 | 0 | 1 | 1 | 1 |
| 1 | 1 | 1 | 0 | 1 | 1 | 1 | 1 | 1 | 1 |
| 1 | 1 | 1 | 1 | 1 | 1 | 1 | 1 | 1 | 1 |

FIG. 11

| h | E = 0 | | | E = 1 | | |
|---|---|---|---|---|---|---|
|   | D3 | D2 | D1 | D3 | D2 | D1 |
| 0 | 0 | 0 | 0 | 0 | 0 | 0 |
| 1 | 0 | 0 | 0 | 0 | 0 | 1 |
| 2 | 0 | 0 | 1 | 0 | 0 | 1 |
| 3 | 0 | 0 | 1 | 0 | 1 | 0 |
| 4 | 0 | 1 | 0 | 0 | 1 | 0 |
| 5 | 0 | 1 | 0 | 0 | 1 | 1 |
| 6 | 0 | 1 | 1 | 0 | 1 | 1 |
| 7 | 0 | 1 | 1 | 1 | 0 | 0 |
| 8 | 1 | 0 | 0 | 1 | 0 | 0 |
| 9 | 1 | 0 | 0 | 1 | 0 | 1 |
| 10 | 1 | 0 | 1 | 1 | 0 | 1 |
| 11 | 1 | 0 | 1 | 1 | 1 | 0 |
| 12 | 1 | 1 | 0 | 1 | 1 | 0 |
| 13 | 1 | 1 | 0 | 1 | 1 | 1 |
| 14 | 1 | 1 | 1 | 1 | 1 | 1 |
| 15 | 1 | 1 | 1 | 1 | 1 | 1 |

IMAGE DISPLAY USING LIQUID CRYSTAL DISPLAY PANEL

BACKGROUND OF THE INVENTION

This invention relates to an image display apparatus for a liquid crystal television receiver using a liquid crystal display panel.

Recently, portable liquid crystal television receivers using a liquid crystal display panel have been replacing CRTs in practical use. In Japanese television broadcasting the NTSC system is adopted. In the NTSC system, one vertical scanning period or one field has 262.5 horizontal scanning lines. On the other hand, a liquid crystal display panel having 120 by 160 picture elements has 120 scanning side electrodes, which correspond in number to substantially one half the number of effective horizontal scanning lines in one field of the video signal in the prior art. This means that the scanning side electrodes are driven for display each for every two horizontal scanning periods. In a liquid crystal television receiver using a liquid crystal display panel, one back plate period for a liquid crystal display panel corresponds to two horizontal scanning periods in the video signal. With the prior art liquid crystal television receiver, a video signal for only one horizontal scanning period is sampled during one back plate period, i.e., the sampled data is used for display for one back plate period. That is, with the prior art liquid crystal television receiver only substantially one half of the video signal of the ordinary television receiver can be obtained in the same horizontal scanning period. Therefore, even if the sampled video signal for a horizontal scanning period contains noise, it is displayed as such for one back plate period. In addition, even if adjacent video signals in one back plate period are considerably different, only one of them is used, leading to deterioration of the image display quality.

Further, in a prior art liquid crystal television receiver where signal electrode side register and driver circuit have n-bit structures, an n-bit television signal is received for display in $2^n$ gradations. Therefore, if the number of bits is insufficient, the number of gradations is also insufficient, so that fine intermediate tones of color cannot be sufficiently displayed. To increase the number of gradations, it is necessary to increase the number of bits, thus leading to complication of the circuit construction.

SUMMARY OF THE INVENTION

An object of the invention is to provide an image display apparatus, which can obviate the above drawbacks and permits the number of gradations to be increased without complicating the circuit construction while permitting simplification of the driver circuit in case when the number of gradations is not increased.

To attain the above object of the invention, there is provided an image display apparatus with a liquid crystal display panel, which comprises A/D conversion means for sampling a television signal a plurality of times in a horizontal effective display period and converting the sampled television signal into digital data consisting of a predetermined number of bits, data control circuit means for receiving a data control signal with the signal level thereof changed for each back plate period in the liquid crystal display panel corresponding to a plurality of horizontal scanning lines and digital data obtained from the A/D converter and for providing data consisting of a smaller number of bits than the bit number of digital data every time the level of said data control signal changes, means for generating a gradation signal in each back plate period according to data provided a plurality of times in one back plate period from the data control circuit means, and means for driving the liquid crystal display panel according to the gradation signal generated by the gradation signal generating means.

With the image display apparatus having the above construction according to the invention, a gradation signal is synthesized in one back plate period, or a new gradation signal is synthesized for two consecutive fields. Thus, it is possible to realize a gradation display similar to the case where there is one more bit than the bits constituting the signal electrode side driver circuit system.

It is thus possible to increase the number of gradations without complicating the circuit construction or, in case when the number of gradations is not increased, simplify the driver circuit. For example, where the segment side shift register and latch circuit individually have 160 stages, a reduction of a 4-bit gradation signal to 3 bits leads to a saving of 320 bits, which is very useful.

BRIEF DESCRIPTION OF THE DRAWINGS

FIG. 11 is a view showing the relation between input data to and output data from the A/D converter shown in FIG. 10;

DETAILED DESCRIPTION OF THE PREFERRED EMBODIMENTS

Figure 1:
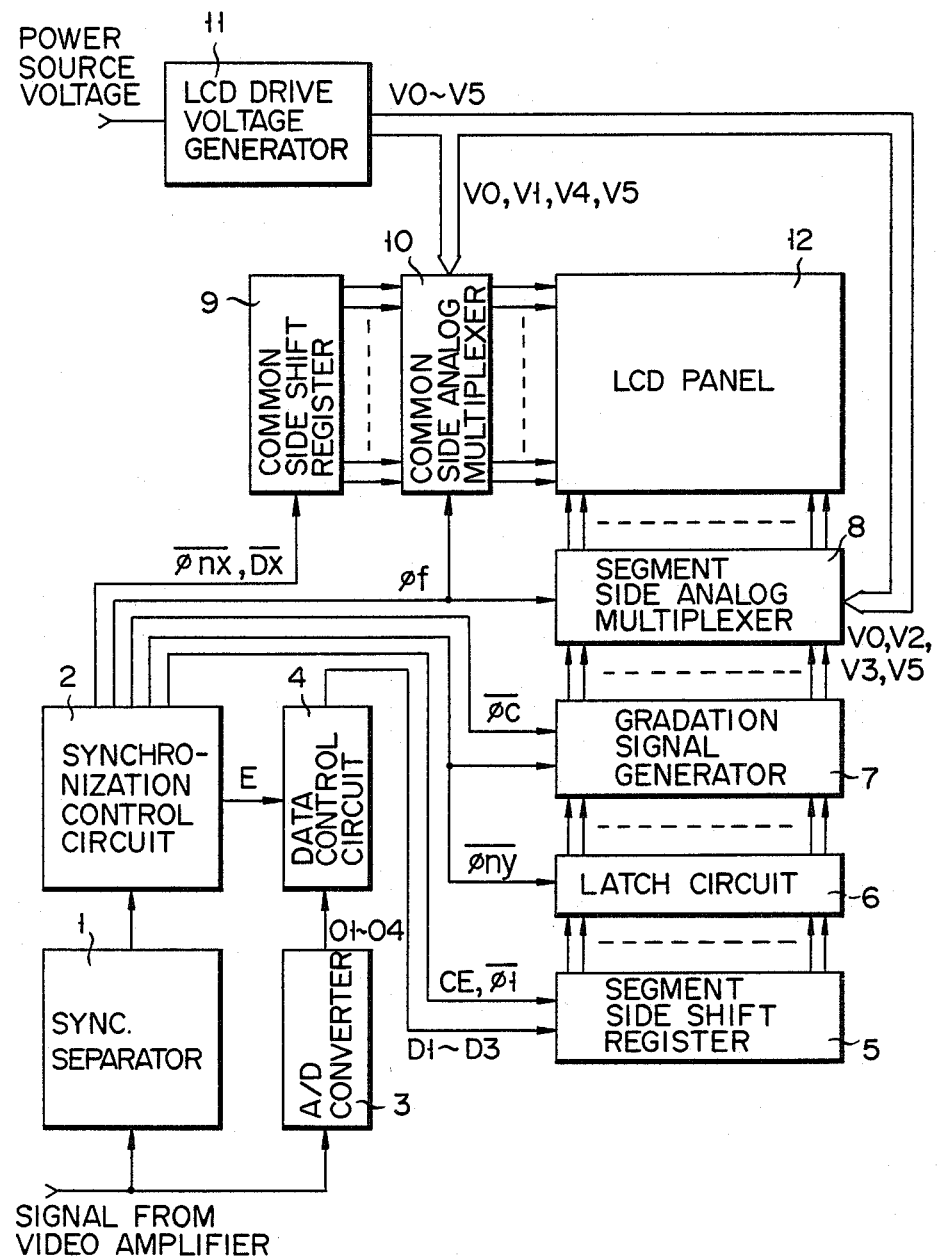
FIG. 1 is a block diagram showing an embodiment of the image display apparatus according to the invention.
Figure 4:
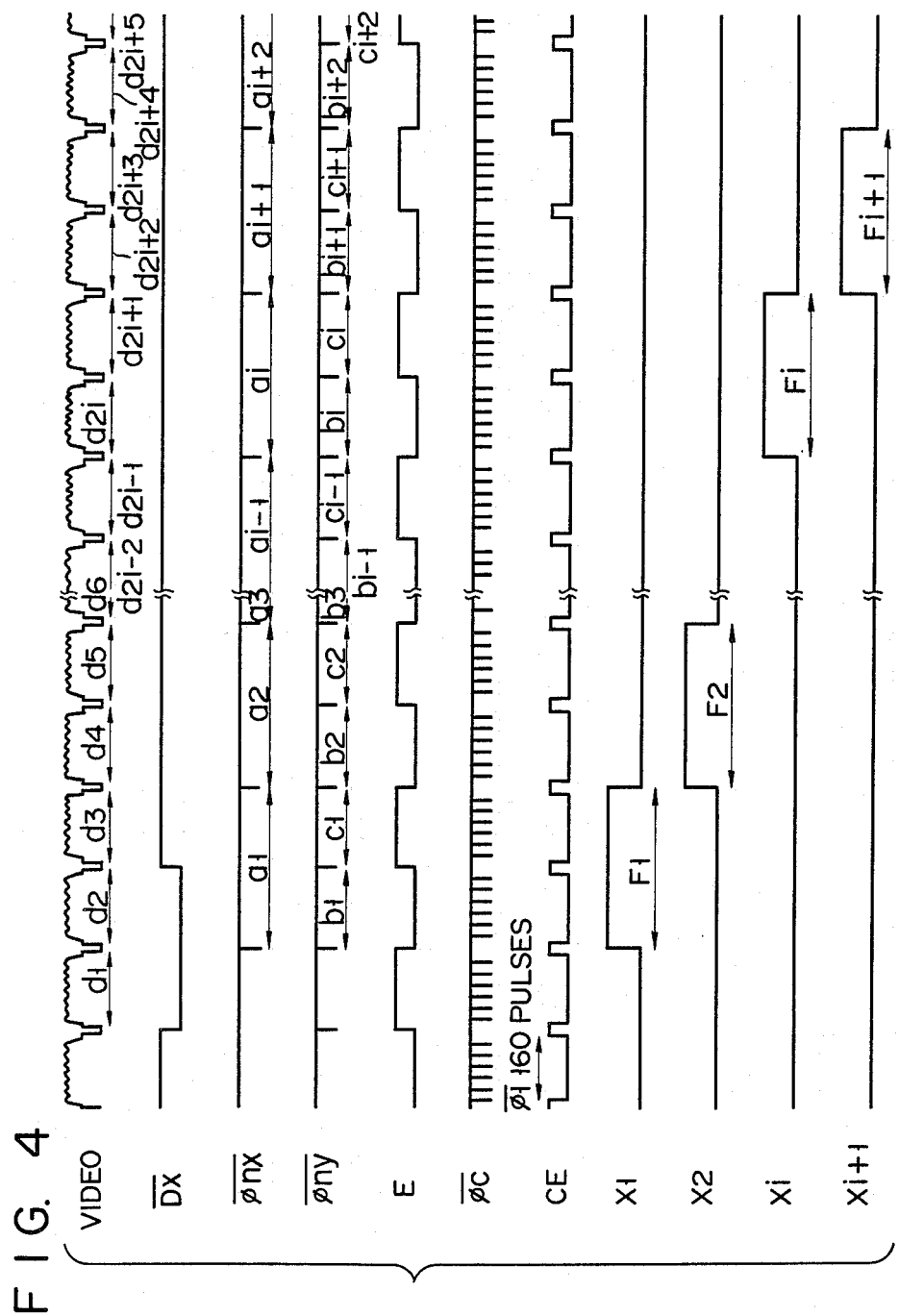
FIG. 4 is a timing chart for explaining the operation of the circuit shown in FIG. 1.

Now, a first embodiment of the invention will be described in detail with reference to FIGS. 1 to 5. Referring to FIG. 1, there is shown an embodiment of the invention applied to a liquid crystal television receiver having 120 by 150 picture elements. In the illustrated image display system, a sync separator 1 separates horizontal and vertical sync signals from a video signal supplied from a prestage video amplifier (not shown) and feeds the separated sync signals to a synchronization control circuit 2. An A/D (analog-to-digital) converter 3 converts the video signal from the video amplifier noted above into a 4-bit digital signal $O_1$-$O_4$ to be fed to a data control circuit 4. The synchronization control circuit 2 generates various timing signals as shown in FIG. 4 according to the sync signals separated in the sync separator 1, the timing signals being fed to a segment side shift register 5, a latch circuit 6, a gradation signal generator 7, a segment side analog multiplexer 8, a common side shift register 9 and a common side analog multiplexer 10. The synchronization control circuit 2 further generates a data control signal E which is a digital signal fed to the data control circuit 4. The data control circuit 4 generates a 3-bit signal $D_1$-$D_3$ fed to the segment side shift register 5 according to the 4-bit data from the A/D converter 3 and data control signal E from the synchronization control circuit 2, as will be described later in detail. The shift registers 5 has a structure of 3 bits by 60 stages. It reads out the 3-bit data $D_1$-$D_3$ from the data control circuit 4 in synchronism to a chip enable signal CE and a clock signal $\overline{\phi}_1$ from the synchronization control circuit 2, the read-out data being fed to the latch circuit 6. The latch circuit 6 has a structure consisting of 3 bits by 160 stages. It reads out input data in synchronism to a latch signal $\overline{\phi}_{ny}$ from the synchronization control circuit 2, the read-out data being fed to the gradation signal generator 7. The gradation signal generator 7 operates in synchronism to the clock signal $\overline{\phi}_{ny}$ and a timing signal $\overline{\phi}_c$ from the synchronization control circuit 2 to generate a gradation signal according to the latch data in the latch circuit 6, the gradation signal being fed to the segment side analog multiplexer 8. To the multiplexer 8 are fed drive voltages $V_0$, $V_2$, $V_3$ and $V_5$ from a liquid crystal drive voltage generator 11 and also a frame signal $\phi_f$ from the synchronization control circuit 2. The multiplexer 8 generates a liquid crystal drive voltage according to the gradation signal and frame signal $\phi_f$ noted above to drive segment electrodes of a liquid crystal display panel 12 having 120 by 160 picture elements. The common side shift register 9 has a structure of 1 bit by 120 stages. It reads out a signal $\overline{D}_x$ from the synchronization control circuit 2 according to a timing signal $\overline{\phi}_{nx}$ and shifts the read-out signal. The output of the common side shift register 9 is fed to the common side analog multiplexer 10. Of the liquid crystal drive voltages $V_0$ to $V_5$ generated by the liquid crystal drive voltage generator 11, the voltages $V_0$, $V_1$, $V_4$ and $V_5$ are fed to the multiplexer 10, and the voltages $V_0$, $V_2$, $V_3$ and $V_5$ are fed to the multiplexer 8. The multiplexer 10 drives common electrodes of the liquid crystal display panel 12 according to the data from the shift register 9.

Figures 2, 3:
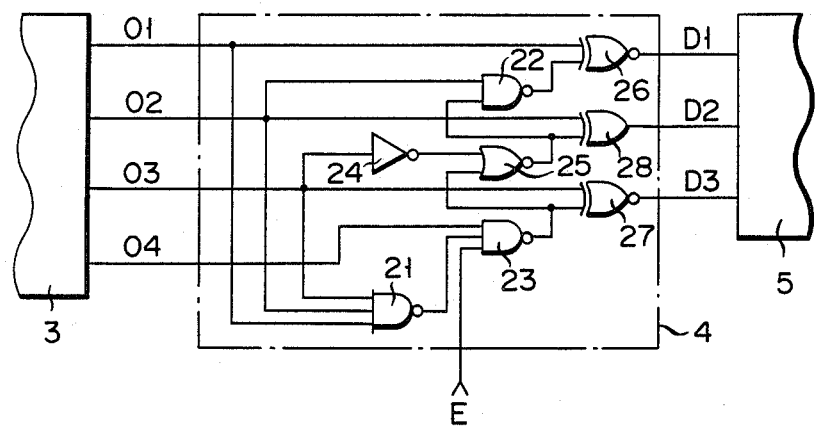
FIG. 2 is a circuit diagram showing a specific circuit construction of a data control circuit shown in FIG. 1.
FIG. 3 is a view showing the relation between input data to and output data from the data control circuit.

The data control circuit 4 will now be described in detail with reference to FIG. 2. The data control circuit 4 includes NAND gates 21 to 23, an inverter 24, a NOR gate 25, exclusive-NOR gates (hereinafter referred to as EX-NOR gates) 26 and 27 and an exclusive-OR gate (hereinafter referred to as EX-OR gate) 28. Of the 4-bit data $O_1$ to $O_4$ provided from the A/D converter 3, the data $O_1$ is fed to the NAND gate 21 and EX-NOR gate 26, the data $O_2$ is fed to the NAND gates 21 and 22 and EX-OR gate 28, the data $O_3$ is fed to the NAND gate 21, inverter 24 and EX-NOR gate 27, and the data $O_4$ is fed to the NAND gate 23. To the NAND gate 23 are also fed the output of the NAND gate 21 and data control signal E from the synchronization control circuit 2, and the output signal of the NAND gate 21 is fed to the EX-NOR gate 27. The output of the NAND gate 23 and the output of the inverter 24 are fed through the NOR gate 25 to the EX-OR gate 28 and NAND gate 22. The output of the NAND gate 22 is fed to the EX-NOR gate 26. The outputs of the EX-NOR gate 26, EX-OR gate 28 and EX-NOR gate 27 are fed as the 3-bit data $D_1$-$D_3$ to the segment side shift register 5. The data control signal E has a level which is alternately inverted to "1" and "0" in synchronism to the timing signal $\overline{\phi}_{ny}$ as shown in FIG. 4. The signal E changes the output data $D_1$ to $D_3$ of the data control circuit 4 to two different values. More specifically, the data control circuit 4 provides data $D_1$-$D_3$ of two different values as the data control signal E is inverted to "0" or "1" according to the data $O_1$-$O_4$ from the A/D converter 3 as shown in FIG. 3.

The operation of the embodiment having the above construction will now be described. The synchronization control circuit 2 feeds the signal to the common side shift register 9 for one back plate period in synchronism to the vertical sync signal, as shown in FIG. 4. The signal $\overline{D}_x$ is read into the common side shift register 9 according to the clock $\phi_{nx}$ provided from the synchronization control circuit 2 for every back plate period, and is shifted through the shift register 9. The shift register 9 feeds successive signals X1, X2, . . . each having one back plate duration F as shown in FIG. 4 to the common side analog multiplexer 10. The multiplexer 10 feeds the liquid crystal drive signals $V_0$, $V_1$, $V_4$ and $V_5$ to the liquid crystal display panel 12 according to the signal from the shift register 9 for driving the common electrodes. More specifically, the signal X1 selects the corresponding common electrode for one back plate period a1, the signal X2 selects the corresponding common electrode for the next back plate period a2, and so forth. The multiplexer 10 inverts the liquid crystal drive signal in synchronism to the frame signal.

Meanwhile, A/D converter 3 samples the video signal supplied from the video amplifier in individual horizontal scanning periods d1, d2, . . . as shown in FIG. 4 for conversion to the 4-bit digital signal $O_1$-$O_4$ fed to the data control circuit 4. The data control circuit 4 provides the 3-bit data $D_1$-$D_3$ according to the signal $O_1$-$O_4$ from the A/D converter 3 and data control signal E from the synchronization control circuit 2. More specifically, the data control circuit 4 provides data $D_1$ to $D_3$ corresponding to the data $O_1$ to $O_4$ from the A/D converter 3 as different values when the data control signal E is E=0 and E=1, respectively, as shown in FIG. 3. The level of the data control signal E is inverted in synchronism to the latch signal $\overline{\phi}_{ny}$ as shown in FIG. 4. For example, the data control signal E is "0" for the first half b of one back plate period and is "1" for the second half c of the period. The data $D_1$-$D_3$ from the data control circuit 4 is fed to the segment shift register 5. When the chip enable signal CE is provided from the synchronization control circuit 2, the shift register 5 reads out the data $D_1$-$D_3$ from the A/D converter 3 in synchronism to the clock $\phi_1$. When data has been read into all the bits of the shift register 5, the synchronization control circuit 2 produces a latch pulse $\overline{\phi}_{ny}$, causing the data in the shift register 5 to be latched in the latch circuit 6 to be fed to the gradation signal generator 7. The gradation signal generator 7 counts the clock signal $\phi_c$ according to the data from the latch circuit 6 to produce the gradation signal fed to the multiplexer 8. The multiplexer 8 feeds the liquid crystal drive signals $V_0$, $V_2$, $V_3$ and $V_5$ to the liquid crystal display panel 12 according to the gradation signal from the gradation signal generator 7 for driving the segment electrodes. At this time, the multiplexer 8 inverts the liquid crystal drive signals $V_0$, $V_2$, $V_3$ and $V_5$ in synchronism to the frame signal $\phi_f$ for dynamically driving the liquid crystal display panel 12. While the gradation signal for driving the liquid crystal display panel 12 is produced according to the data provided from the data control circuit 4 in the manner as described above, the data control circuit 4 performs different operations according to the data control signal E. Thus, even if entirely the same data is provided from the A/D converter 3 for the first and second halves of one back plate period, the data control circuit 4 produces different data for the first and second halves of the back plate period according to the data control signal E as shown in FIG. 3. The output level of the data control circuit 4 is thus switched for every horizontal scanning period according to the data control signal E. More specifically, when the data control signal E is at "O" level, the upper three bits of the input data $O_1$ to $O_4$ are provided as data $D_1$ to $D_3$ from the data control circuit 4 to be used for the display for one horizontal scanning period. In the horizontal scanning period, the data control signal E is at "1" level. In this case, if the least significant bit $O_4$ of the output data $O_1$ to $O_4$ of the A/D converter 3 is "O", the upper three bits are provided as data $D_1$ to $D_3$ from the data control circuit 4. If the least significant bit $O_4$ is "1", "1" is added to the upper three bits, and the resultant data is provided as data $D_1$ to $D_3$.

Figure 5:
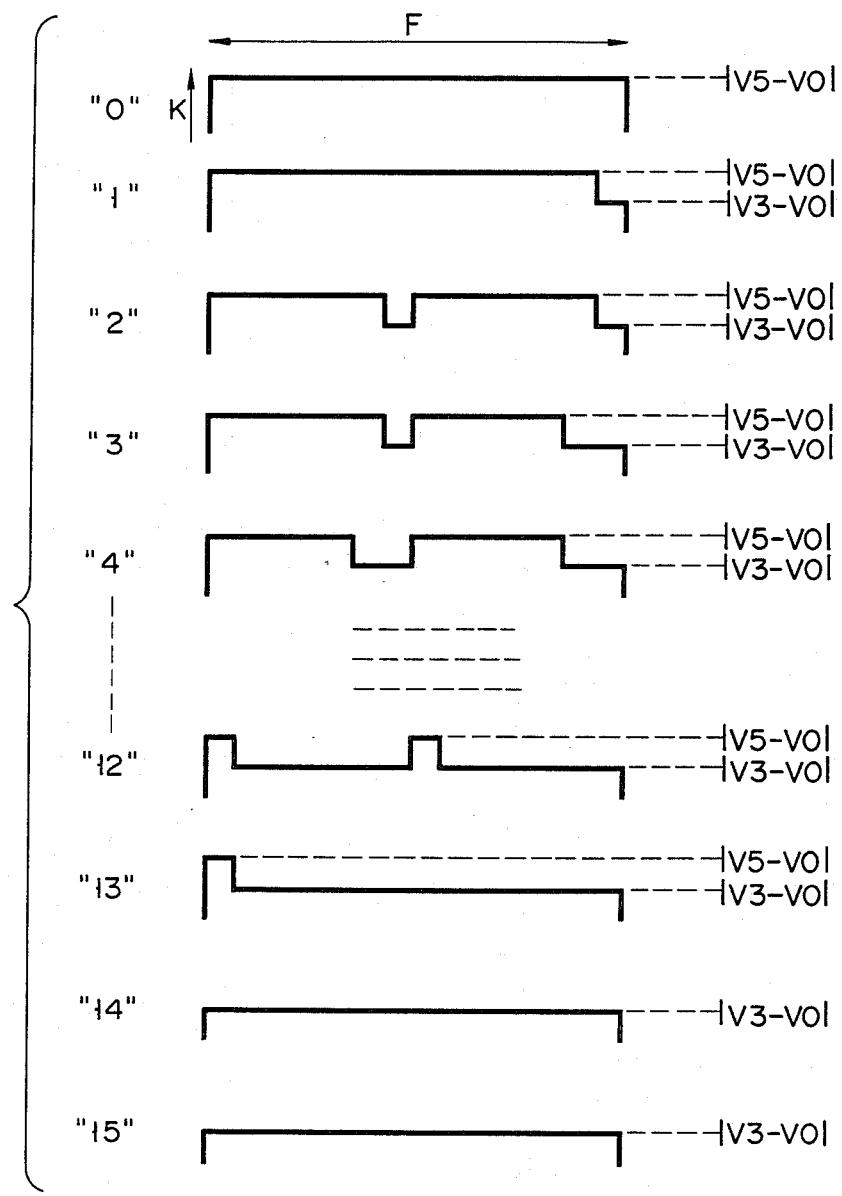
FIG. 5 is a waveform chart showing gradation signals generated in the circuit shown in FIG. 1.

Therefore, the gradation signal generator 7 provides different gradation signals for the first and second halves b and c of one back plate period as shown in FIG. 5. FIG. 5 shows waveforms of gradation signals "O" to "15". In the liquid crystal display panel 12, the same common electrode is scanned during one back plate period noted above. The gradation signal provided from the generation signal generator 7 thus has a single gradation level for both the first and second halves b and c of one back plate period as shown in FIG. 5. The video data for each horizontal scanning line can be regarded to be the same for the first and second periods b and c of one back plate period, so that it is possible to control sixteen different gradations "O" to "15" according to the 3-bit data $D_1$-$D_3$ provided from the data control circuit 4.

In the embodiment of FIG. 1 shown above, the data $D_1$ to $D_3$ have been controlled according to the data control signal E provided from the synchronization control circuit 2 to the data control circuit 4.

Figure 6:
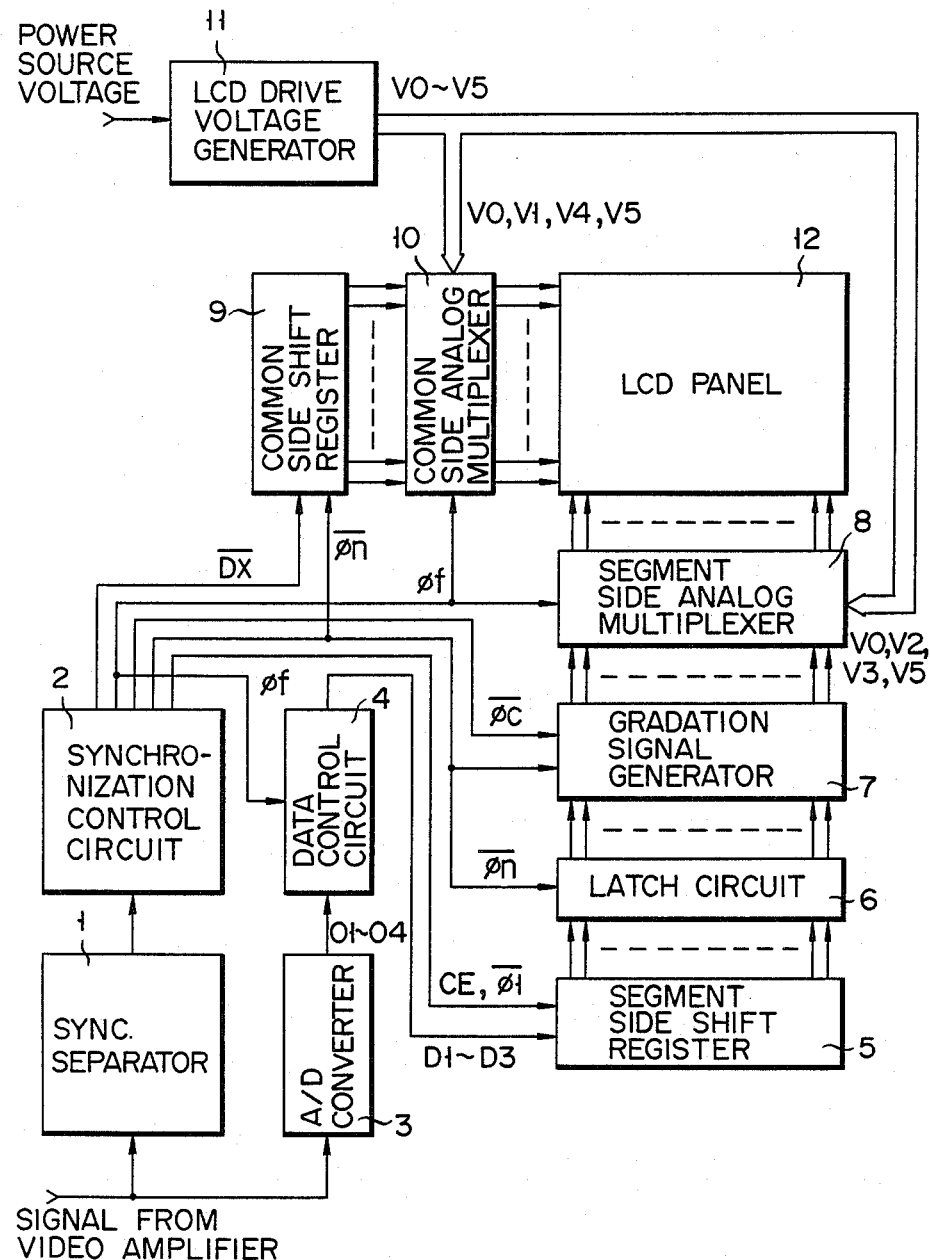
FIG. 6 is a block diagram showing a different embodiment of the image display apparatus according to the invention.
Figure 7:
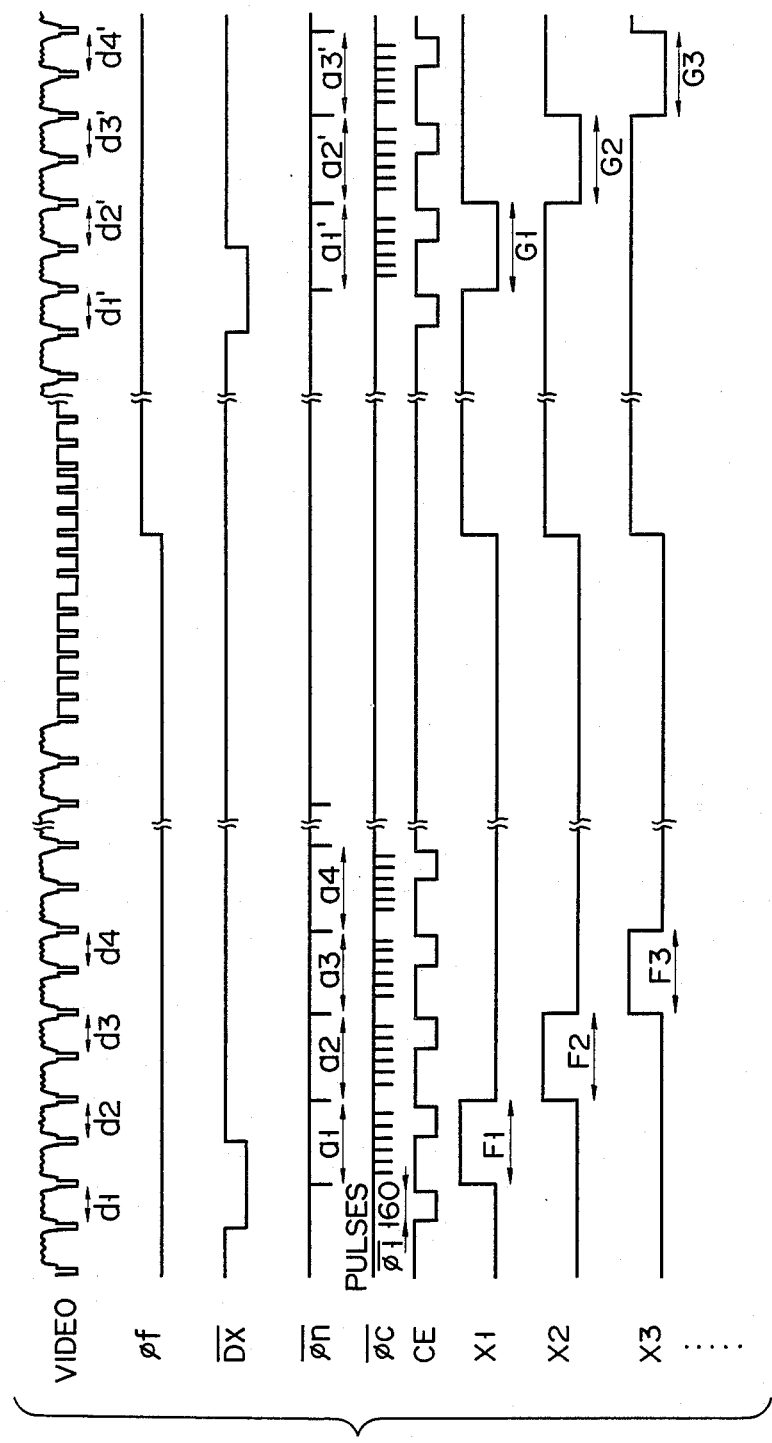
FIG. 7 is a timing chart for explaining the operation of the circuit shown in FIG. 6.
Figure 8:
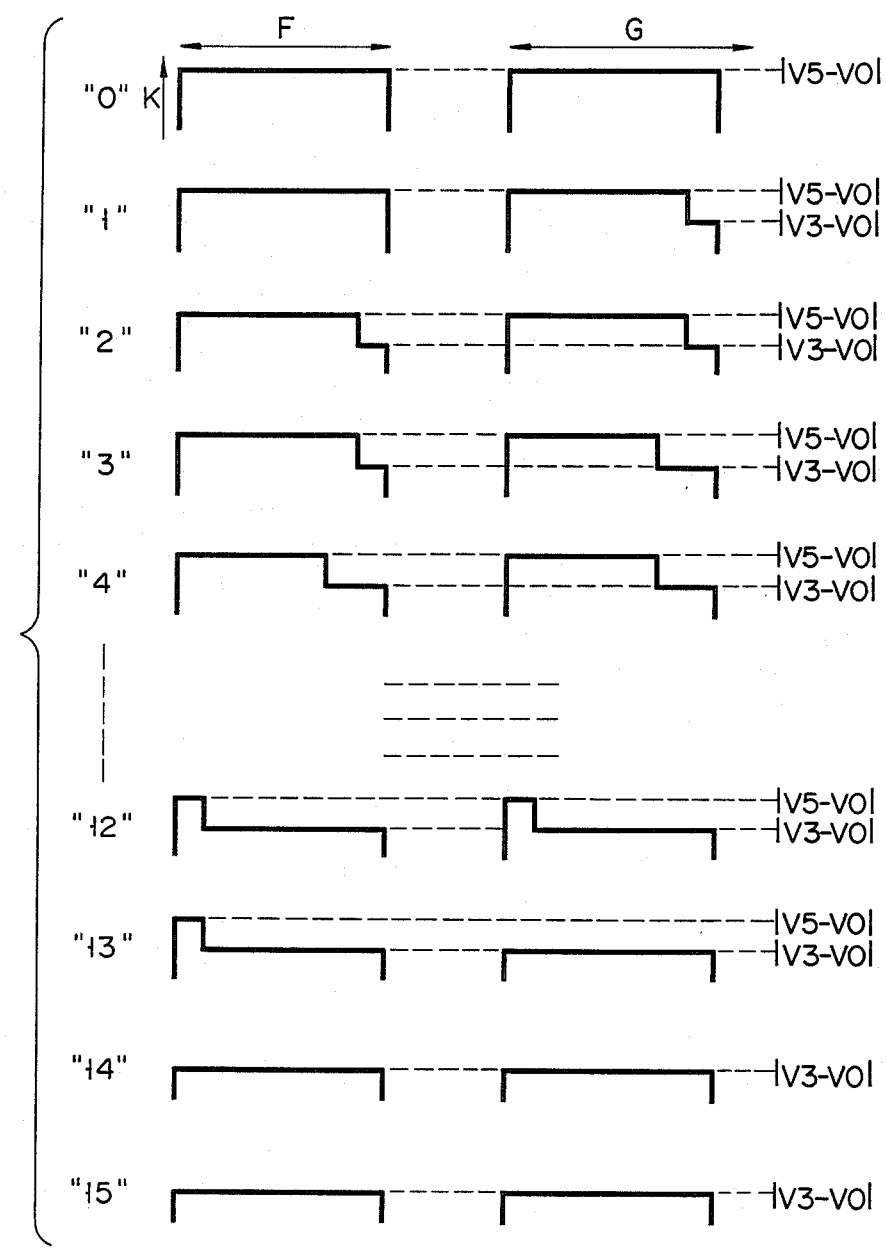
FIG. 8 is a waveform chart showing gradation signals generated in the circuit shown in FIG. 6.

FIGS. 6 to 8 illustrate a different embodiment. In this instance, a frame signal $\phi_f$ provided from a synchronization control circuit 2 is provided as a data control signal to a data control circuit 4, while the synchronization control circuit 2 feeds a timing signal $\overline{\phi}_n$ to a latch circuit 6, a gradation signal generator 7 and a common side shift register 9. The timing signal $\overline{\phi}_n$ consists of pulses each provided for every other horizontal sync signal as shown in FIG. 7, and it corresponds to the timing signal $\overline{\phi}_{nx}$ shown in FIG. 1. A chip enable signal CE also consists of pulses each provided for every other horizontal scanning line for selecting the video signal for every other horizontal scanning line. In FIG. 6, parts like those in FIG. 1 are designated by like reference numerals.

In the above structure, the A/D converter 3 converts the video signal supplied from the video amplifier into 4-bit digital data $O_1$-$O_4$ to be fed to the data control circuit 4. Like the preceding embodiment, the data control circuit 4 converts the digital signal $O_1$-$O_4$ provided from the data control circuit 4 into 3-bit data $D_1$-$D_3$ according to the frame signal $\phi_f$ from the synchronization control circuit 2. The data $D_1$ to $D_3$ provided from the data control circuit 4 are read into the segment side shift register 5 in synchronism to the chip enable signal CE and clock $\overline{\phi}_1$. The data written in the shift register 5 is latched in the latch circuit 6 in synchronism to the timing signal $\overline{\phi}_n$ to be fed to the gradation signal generator 7. The gradation signal generator 7 generates a gradation signal corresponding to the data latched in the latch circuit 6 under the control of the timing signals $\overline{\phi}_n$ and $\overline{\phi}_c$, the gradation signal thus produced being fed to the segment side analog multiplexer 8 for driving the liquid crystal display panel 12.

The output level of the data control circuit 4 is switched for very field according to the frame signal $\phi_f$. More specifically, when the frame signal $\phi_f$ is at "O" level, the upper three bits of the input data $O_1$ to $O_4$ are fed as data $D_1$ to $D_3$ to the data control circuit 4 to be used for the display for one field. In the next field, the frame signal $\phi_f$ is at "1" level. In this case, if the least significant bit O of the output data $O_1$ to $O_4$ of the A/D converter 3 is "O", the upper three bits are provided as data $D_1$ to $D_3$ from the data control circuit 4. If the least significant bit $O_4$ is "1", "1" is added to the upper three bits, and the resultant data are provided as data $D_1$ to $D_3$ to the data control circuit 4.

The video signal of the individual horizontal scanning lines can be regarded to be the same for the two adjacent fields noted above. Thus, the shade is displayed for two fields F and G as a unit as shown in FIG. 8. That is, a signal of 4 bits in effect, i.e., 15 gradations can be provided although the data control circuit 4 provides a 3-bit signal, i.e., an 8-gradation signal.

Figure 9:
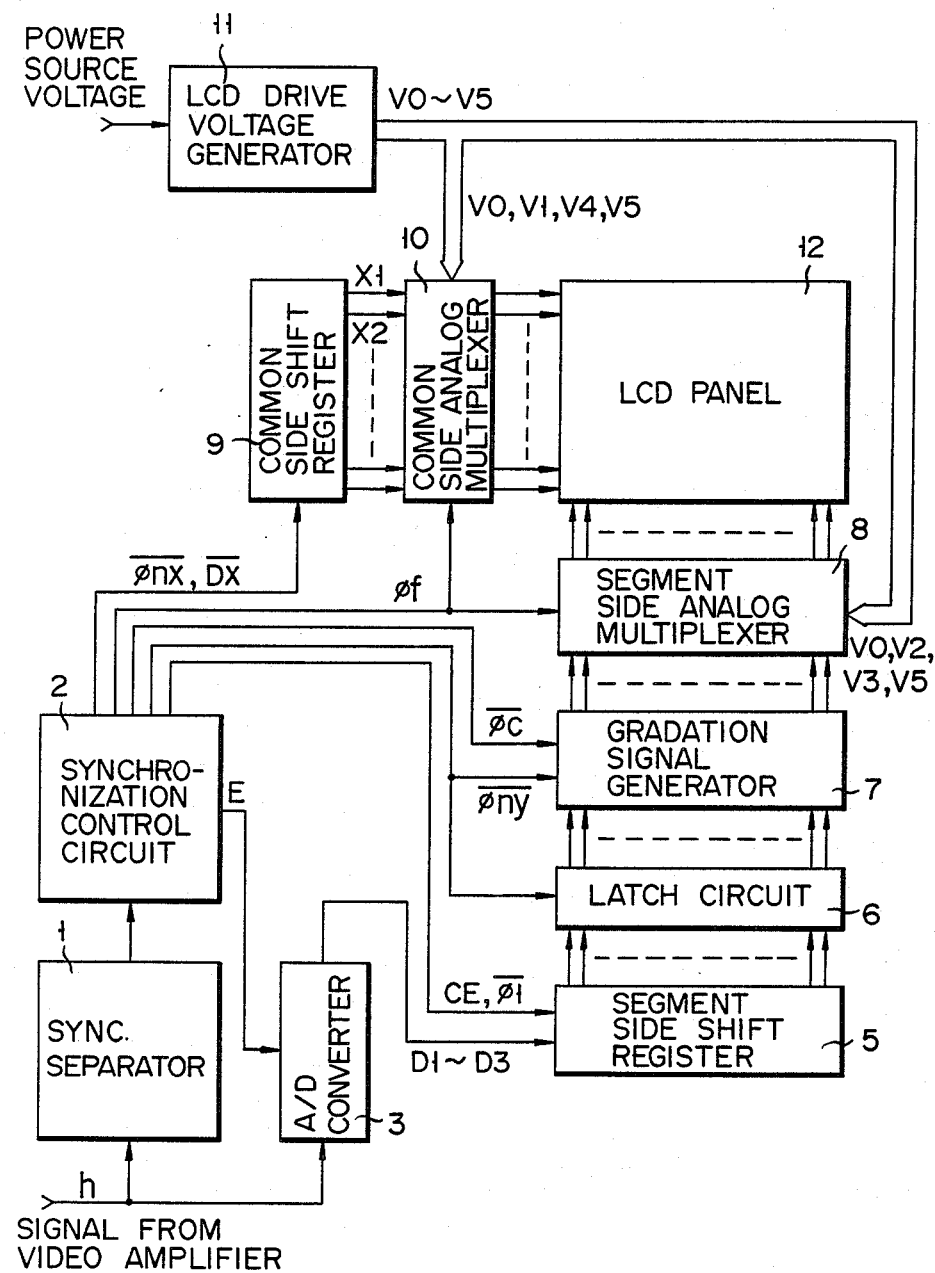
FIG. 9 is a block diagram showing a further embodiment of the image display apparatus according to the invention.

FIG. 9 shows a further embodiment of the invention.

The circuit construction shown in FIG. 9 is the same as the circuit construction shown in FIG. 1 except that the data control circuit 4 in the circuit of FIG. 1 is omitted, the data control signal E from the synchronization control circuit 2 is fed to the A/D converter 3, and the output of the A/D converter 3 is fed to the segment side shift register 5. In FIG. 9, parts like those in FIG. 1 are designated by like reference numerals.

Figure 10:
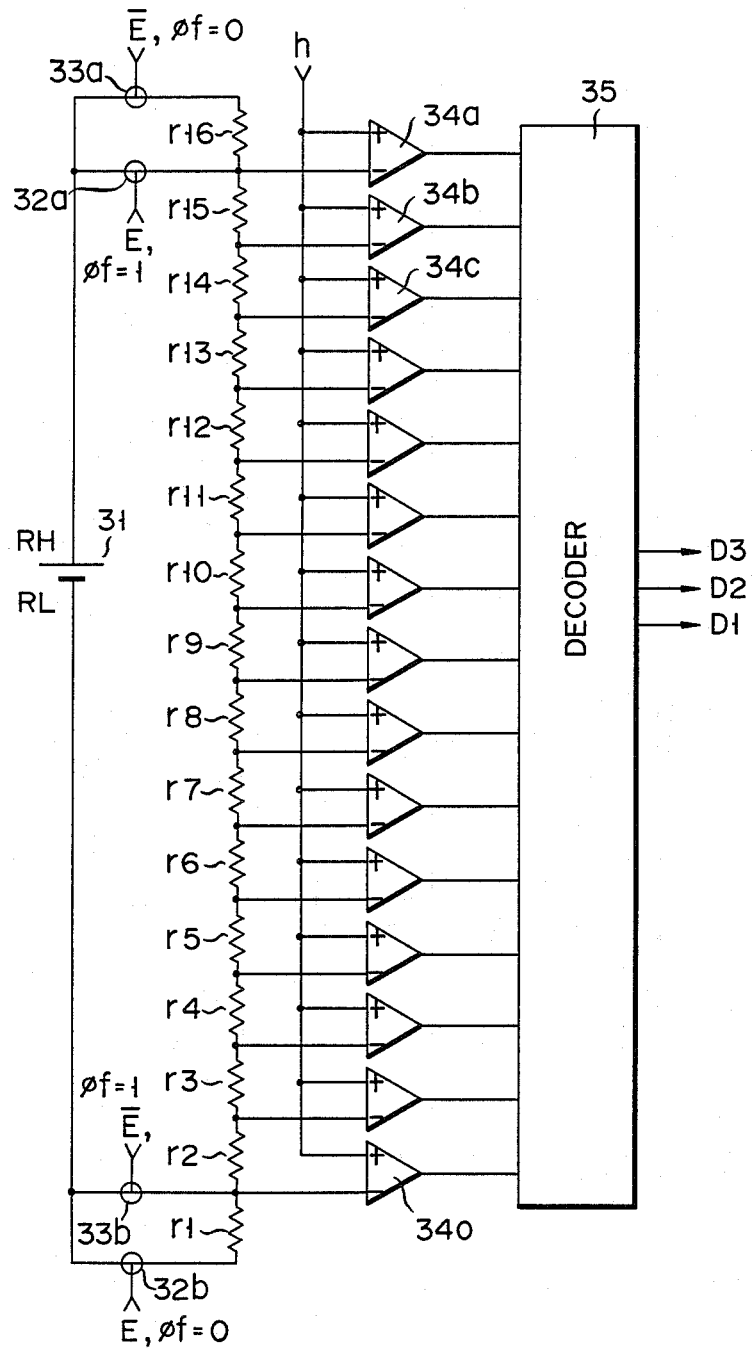
FIG. 10 is a schematic representation of a specific circuit construction of an A/D converter shown in FIG. 9.
Figure 12:
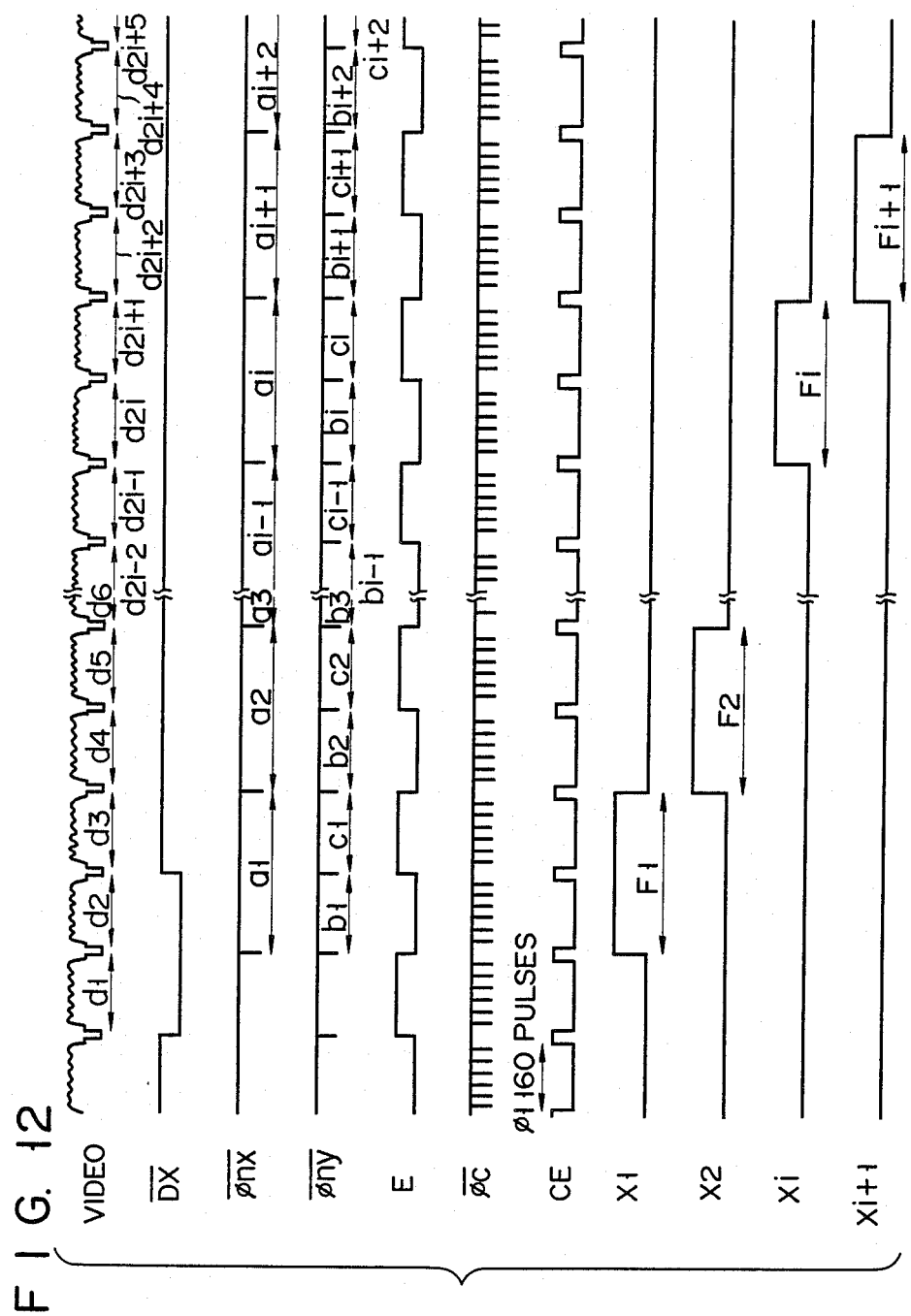
FIG. 12 is a timing chart for explaining the operation of the circuit shown in FIG. 10.

The A/D converter 3 in the circuit of FIG. 9 will now be described in detail with reference to FIG. 10. Referring to FIG. 10, the A/D converter includes a voltage divider 30 which includes series resistors r1 to r16 having an equal resistance. A reference voltage power supply 31 is connected across a series circuit consisting of the resistors r1 to r15 via gates 32a and 32b, and it is connected across a series circuit consisting of the resistors r2 to r16 via gates 33a and 33b. The gates 32a and 32b are gate controlled according to the data control signal E from the synchronization control circuit 2, and the gates 33a and 33b are gate controlled according to an inverted signal obtained for the data control signal E. The connection points between adjacent ones of the resistors r1 to r16 are each connected to a minus input terminal of each of comparators 34a to 34o. A video signal h from the video amplifier (not shown) is fed to a plus terminal of each of the comparators 34a to 34o. The comparators 34a to 34o compare respective division voltages obtained from the output voltage of the reference power supply 31 through the resistors r1 to r16 to the video signal h and provide the results to a decoder 35. The decoder decodes the outputs of the comparators 34a to 34o to recover the 3-bit data $D_1$ to $D_3$ which are fed to the segment side shift register 5. The level of the data control signal E is inverted alternately to "1" and "O" in synchronism to the timing signal $\overline{\phi}_{ny}$ as shown in FIG. 12, and the A/D converter 3 provides output data $D_1$ to $D_3$ as two different values according to the signal E. More specifically, depending on whether the data control signal E is "1" or "O", the series circuit of the resistors r1 to r15 or resistors r2 to r16 of the voltage divider is selected as shown in FIG. 11, whereby the bias voltage fed to the comparators 34a to 34o is varied to provide the two different values as the data $D_1$ to $D_3$.

The operation of this embodiment will now be described. The synchronization control circuit 2 feeds a signal $\overline{D}x$ to the common side shift register 9 in synchronism to the vertical sync signal for one back plate period as shown in FIG. 12. This signal $\overline{D}x$ is read into the common side shift register 9 under the control of a clock $\overline{\phi}_{nx}$ provided for every back plate period, and it is shifted through the shift register 9. The shift register 9 thus feeds successive signals X1, X2, ... each having a duration F of one back plate period as shown in FIG. 12 to the common side analog multiplexer 10. The multiplexer 10 feeds the liquid crystal drive signals $V_0$, $V_1$, $V_4$ and $V_5$ to the liquid crystal display panel 12 according to the signal from the shift register 9 for driving common electrodes. More specifically, the signal X1 selects the corresponding common electrode for a back plate period a1, the signal X2 selects the corresponding common electrode for the next back plate period a2, and so forth. The multiplexer 10 inverts the liquid crystal drive signal in synchronism to the frame signal $\phi_f$.

Meanwhile, the A/D converter 3 samples the video signal supplied from the video amplifier in successive horizontal scanning periods d1, d2, ... for conversion to the 3-bit digital data $D_1$ to $D_3$ as shown in FIG. 12. The A/D converter 3 provides different data as the data $D_1$ to $D_3$ when the data control signal E is E=0 and E=1, respectively. The level of the data control signal E is inverted according to the latch clock $\overline{\phi}_{ny}$ as shown in FIG. 12. That is, the data control signal E is "O" and "1" for the respective first and second halves b and c of one back plate period. The data $D_1$ to $D_3$ provided from the A/D converter 3 are fed to the segment side shift register 5. The data $D_1$ to $D_3$ from the A/D converter 3 are read out into the shift register 5 in synchronism to the clock when a chip enable signal CE is provided from the synchronization control circuit 2. When the data has been read into all the bits of the shift register 5, the synchronization control circuit 2 produces a latch pulse $\overline{\phi}_{ny}$, thus causing the data held in the shift register 5 to be latched in the latch circuit 6 and to be fed to the gradation signal generator 7. The gradation signal generator 7 generates a gradation signal by counting the clock $\phi_c$ according to the data from the latch circuit 6, the gradation signal thus produced being fed to the multiplexer 8. The multiplexer 8 feeds the liquid crystal drive signals $V_0$, $V_2$, $V_3$ and $V_5$ to the liquid crystal display panel 12 according to the gradation signal from the gradation signal generator 7, whereby segment electrodes are driven for display. In this case, the multiplexer 8 inverts the liquid crystal drive signals $V_0$, $V_2$, $V_3$ and $V_5$ in synchronism to the frame signal $\phi_f$, thus dynamically driving the liquid crystal display panel 12. While the gradation signal is generated according to the data provided from the A/D converter 3 for driving the liquid crystal display panel 12, the A/D converter 3 performs different operations according to the data control signal E. Thus, even if entirely the same video signal is supplied for the first and second halves of one back plate period, the A/D converter 3 provides different data for the first and second half of the back plate period as shown in FIG. 11. That is, the output signal level of the A/C converter 3 is switched for every horizontal scanning period according to the data control signal E. More specifically, when the data control signal E is at "O" level, the gates 33a and 33b are held enabled, so that the voltage of the reference voltage power supply 31 is divided through the resistors r2 to r16 in the voltage divider 30 to obtain reference voltages fed to the comparators 34a to 34o. With the gates 33a and 33b enabled as shown above, a low level side voltage $R_L$ of the reference voltage power supply 31 is fed directly to the comparator 34o while a high level side voltage $R_H$ is fed through the resistor r16 to the comparator 34a. Thus, the reference voltages fed to the comparators 34a to 34o are switched to a low level side. When the data control signal E is at "1" level, the gates 32a and 32b are held enabled, so that the voltage of the reference voltage power supply 31 is divided through the resistors r1 to r15 of the voltage divider 30 to obtain reference voltages fed to the comparators 34a to 34o. With the gates 32a and 32b enabled as shown, the low level side voltage $R_L$ of the power supply 31 is fed through the resistor r1 to the comparator 34o while the high level side voltage $R_H$ is fed directly to the comparator 34a. The reference voltages fed to the comparators 34a to 34o are thus switched to the high level side. The result of comparison of the video signal h to the reference voltages, provided from the comparators 34a to 34o, is fed to the decoder 35 for decoding to produce the data $D_1$ to $D_3$. That is, since the reference voltages of the comparators 34a to 34o are switched according to the level E of the data control signal E, the decoder 35 produces different data as the data $D_1$ to $D_3$ when the data control signal E is "O" and "1", respectively, as shown in FIG. 11.

The gradation signal generator 7 thus produces different gradation signals for the the first and second halves b and c of one back plate period as shown in FIG. 5.

Figure 13:
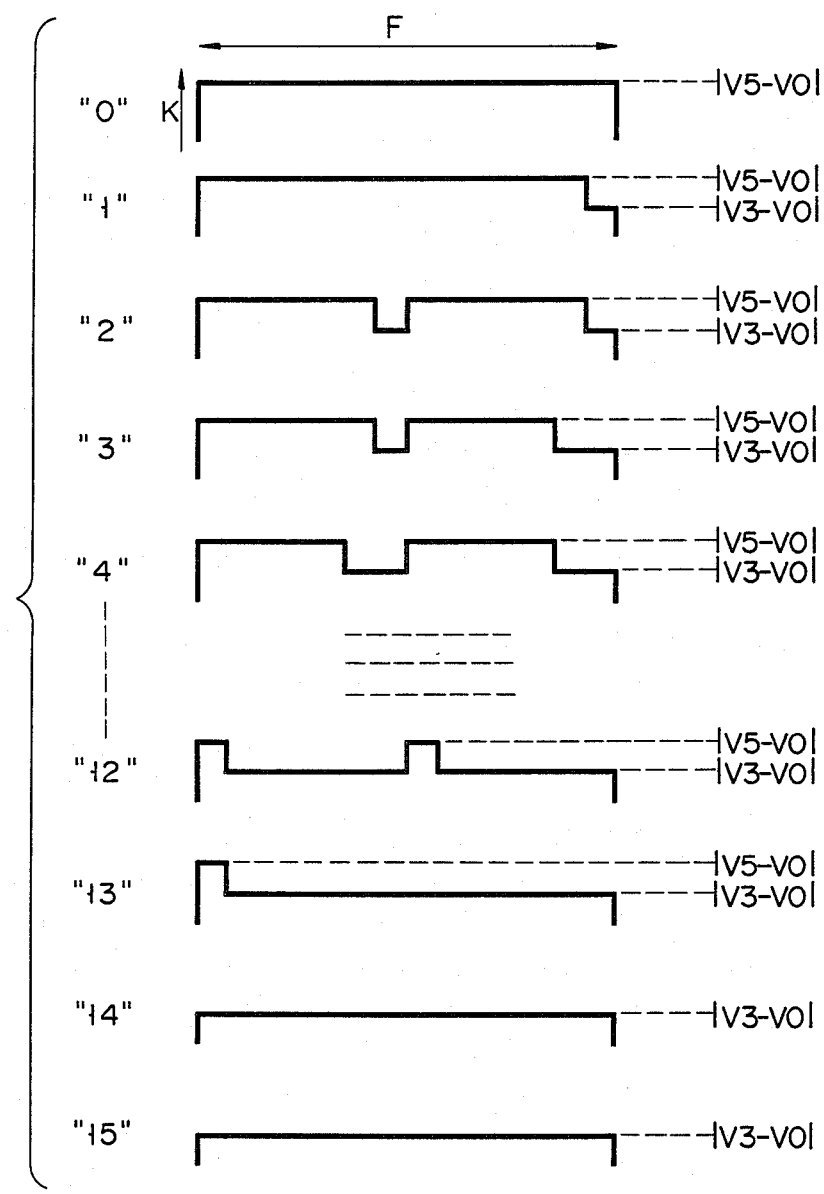
FIG. 13 is a waveform chart showing gradation signals generated in the circuit shown in FIG. 10.

FIG. 13 shows waveforms of gradation signals "O" to "15". In the liquid crystal display panel 12, the same common electrode is scanned during one back plate period. The gradation signal provided from the gradation signal generator 7 thus has a single gradation level for both the first and second halves b and c of one back plate period as shown in FIG. 13. The video data for each horizontal scanning line can be regarded to be the same for the first and second periods b and c of one back plate period, so that it is possible to control sixteen different gradations "O" to "15" according to the 3-bit data $D_1$-$D_3$ provided from the A/D converter 3.

Figure 14:
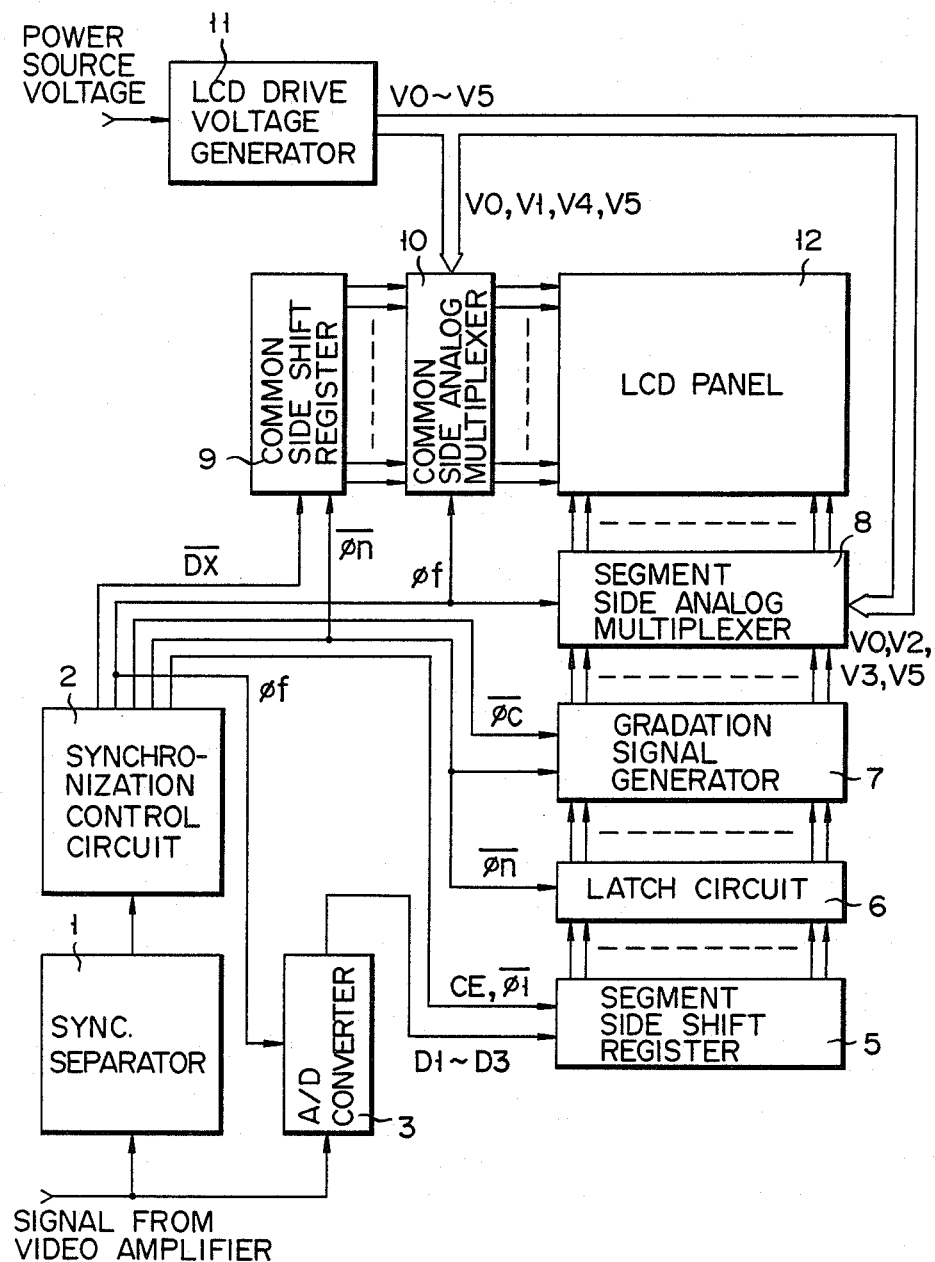
FIG. 14 is a block diagram showing a further embodiment of the image display apparatus according to the invention.
Figure 15:
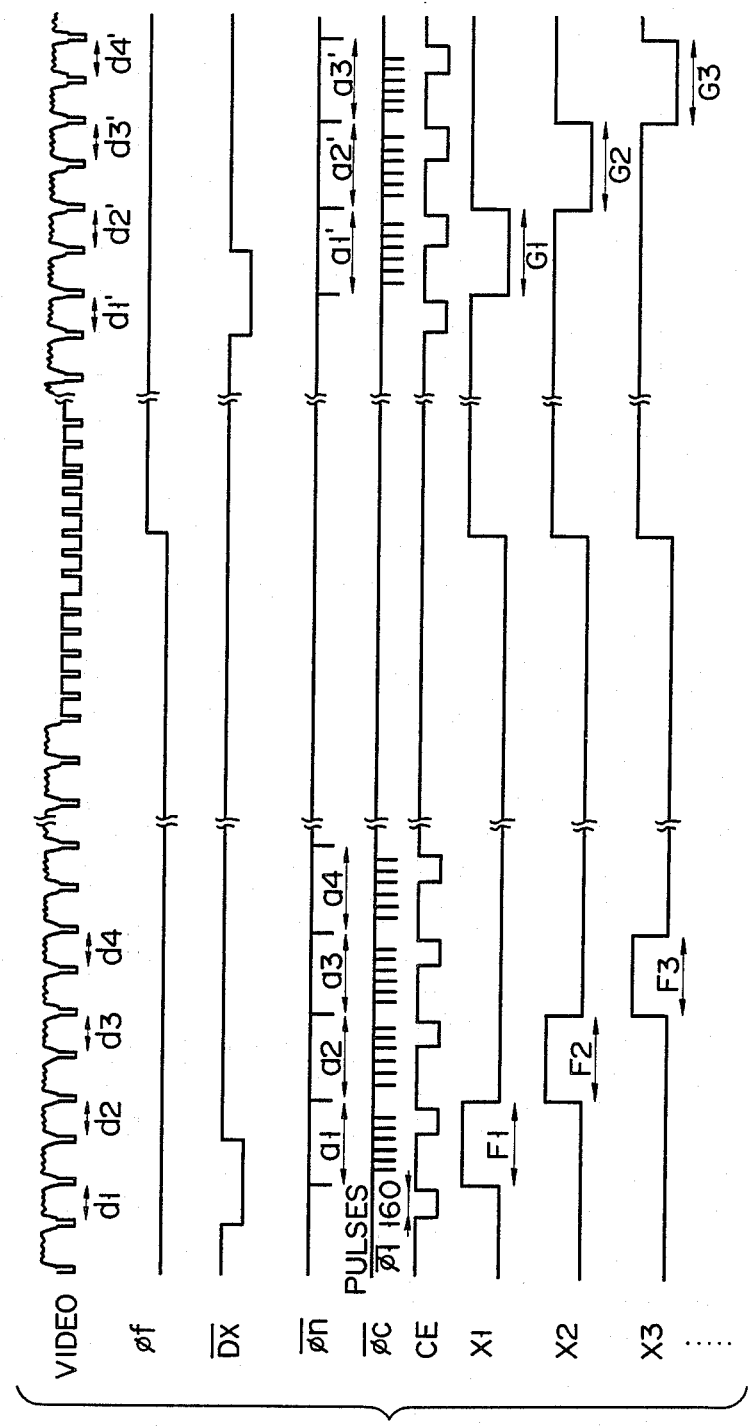
FIG. 15 is a timing chart for explaining the operation of the circuit shown in FIG. 14.

FIG. 14 shows a further embodiment of the invention. In this instance, a frame signal (which is inverted for every television field) provided from the synchronization circuit 2 is fed as a data control signal to the A/D converter 3, and the synchronization control circuit 2 feeds a timing signal $\bar{\phi}_n$ to the latch circuit 6, gradation signal generator 7 and common side shift register 9. The timing signal $\bar{\phi}_n$ consists of pulses each provided for every other horizontal sync pulse, and it corresponds to the timing signals $\bar{\phi}_{nx}$ shown in FIGS. 1 and 4. The chip enable signal CE is provided for every other horizontal scanning line to select the video signal for every other horizontal scanning line.

In the above structure, the A/D converter 3 converts the video signal supplied from the video amplifier into the 3-bit data $D_1$ to $D_3$ according to the frame signal $\phi_f$ from the synchronization control circuit 2 as in the embodiment shown in FIG. 9. The data $D_1$ to $D_3$ provided from the A/D converter 3 are successively read into the segment side shift register 5 in synchronism to the chip enable signal CE and clock $\bar{\phi}_1$. The data written in the shift register 5 is latched in the latch circuit 6 in synchronism to the timing signal $\bar{\phi}_n$ to be fed to the gradation signal generator 7. The gradation signal generator 7 generates a gradation signal corresponding to the data latched in the latch circuit 6 according to the timing signals $\bar{\phi}_n$ and $\bar{\phi}_c$, the gradation signal thus produced being fed to the segment side analog multiplexer 8 for driving the liquid crystal display panel 12.

The output level of the A/D converter 3 is switched for every field according to the frame signal $\phi_f$. When the frame signal $\phi_f$ is at "O" level, the gates 33a and 33b shown in FIG. 10 are held enabled. In this case, the reference voltages of the comparators 34a to 34o are on the low level side. The outputs of the comparators 34a to 34o at this time are decoded in the decoder 35 into the data $D_1$ to $D_3$ to be used for the display for one field. In the next field, the frame signal $\phi_f$ is at "1" level. At this time, the gates 32a and 32b are held enabled, and the reference voltages of the comparators 34a to 34o are on the high level side. The outputs of the comparators 34a to 34o at this time are again decoded in the decoder 35 into the data $D_1$ to $D_3$ to be used for the display for one field.

Figure 16:
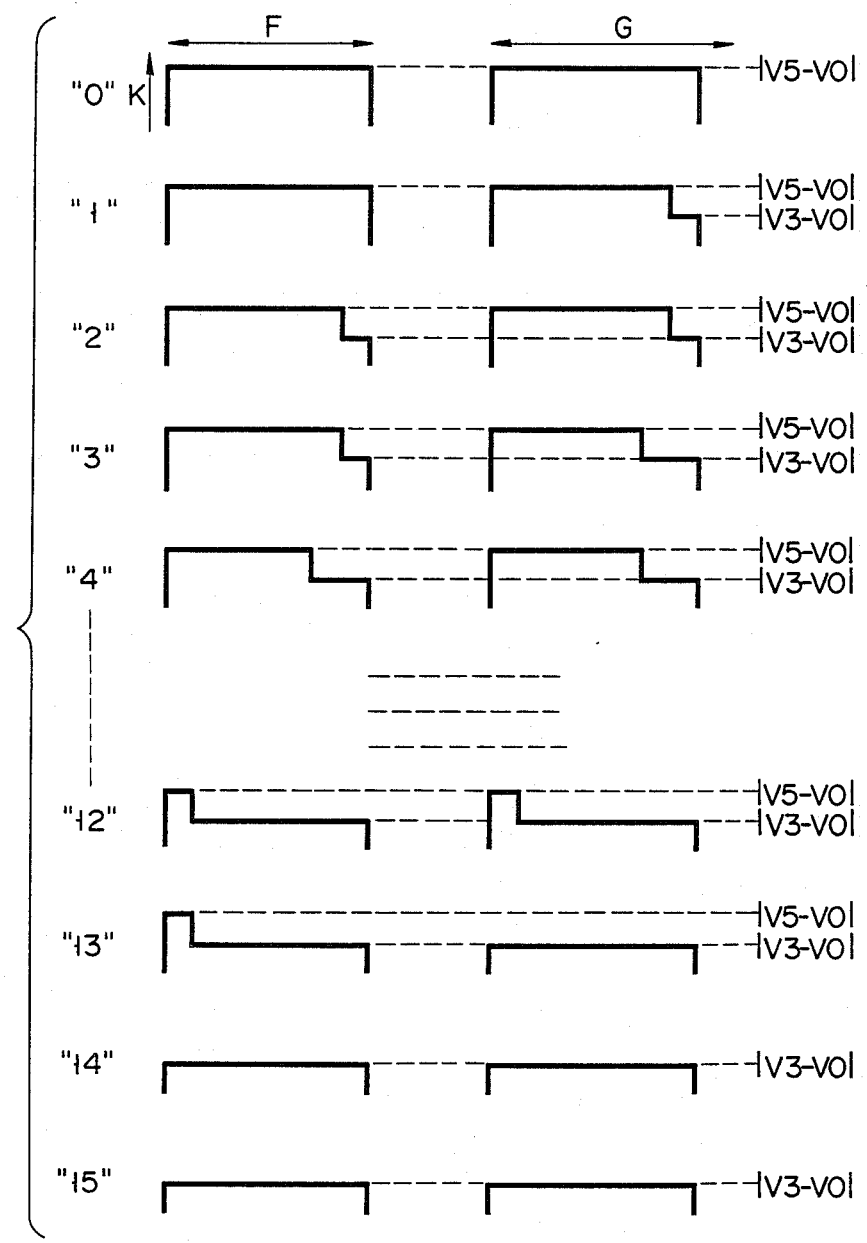
FIG. 16 is a waveform chart showing gradation signals generated in the circuit shown in FIG. 14.

The video signal of the individual horizontal scanning lines can be regarded to be the same for the two adjacent fields noted above. Thus, the shade is displayed for two fields F and G as a unit as shown in FIG. 16. That is, a signal of 4 bits in effect, i.e., 15 gradations, can be provided although the A/D converter 3 provides only the 3-bit data $D_1$ to $D_3$, i.e., an 8-gradation signal.

The above embodiments are concerned with the NTSC system television receiver, but the invention is of course applicable to television receivers of other systems such as the PAL system and SECAM system as well.

What is claimed is:

1. An image display apparatus, comprising:
   a liquid crystal display panel including common electrodes and segment electrodes arranged in the form of a matrix, including means for selecting each common electrode for a predetermined period;
   analog-to-digital (A/D) conversion means for sampling a video signal, for converting the video signal into corresponding n-bit digital data, and for outputting the digital data;
   means responsive to the video signal for outputting a data control signal whose level changes between a first level and a second level during said predetermined period, and for supplying the data control signal to said A/D conversion means;
   said A/D conversion means including data control means responsive to said data control signal for varying the n-bit digital data output from said A/D conversion means according to a predetermined function to obtain (n−1)-bit digital data, said function depending on the level of said data control signal and certain bits of said n-bit digital data;
   means for generating a gradation signal capable of assuming one of ($2^n-1$) levels during said predetermined period in response to the (n−1)-bit digital data output from said A/D conversion means when the level of said data control signal assumes both said first level and said second level; and
   means coupled to said generating means for driving said liquid crystal display panel in accordance with said gradation signal.

2. The image display apparatus according to claim 1, wherein
   said data control means includes logic means coupled to said converting means, for receiving said n-bit digital data and said data control signal, and including means for outputting
   the upper (n−1) bits of said n-bit digital data when the level of said data control signal is at either of said first or said second level and a least significant bit of said n-bit digital data is "O",
   the upper (n−1) bits of said n-bit digital data when the level of said data control signal is at said first level and the least significant bit of said n-bit digital data is "1", and
   the upper (n−1) bits obtained by adding "1" to the (n−1)th bit or to the n-th bit when the level of said data control signal is at said second level and the least significant bit of said n-bit digital data is "1".

3. The image display apparatus according to claim 2, wherein said outputting means outputs the upper (n−1) bits of said n-bit digital data when the level of said data control signal is at either of said first or said second level and each of said n-bit data is "1".

4. The image display apparatus according to claim 1, wherein said A/D conversion means includes a reference voltage source for converting the video signal, and means for switching the level of said reference voltage source in accordance with the level of said data control signal.

5. An image display apparatus, comprising:
   a liquid crystal display panel including common electrodes and segment electrodes arranged in the form of a matrix, including means for selecting each common electrode for a predetermined period;
   analog-to-digital (A/D) conversion means for sampling a video signal, for converting the video signal into corresponding n-bit digital data, and for outputting the digital data;
   means responsive to the video signal for outputting a data control signal whose level changes between a first level and a second level in accordance with at least each of two fields of the video signal, and for supplying the data control signal to said A/D conversion means;
   said A/D conversion means including data control means responsive to said data control signal for varying the n-bit digital data output from said A/D conversion means according to a predetermined function to obtain (n−1) bit digital data, said function depending on the level of said data control signal and certain bits of said n-bit digital data;

means for generating a gradation signal capable of assuming one of $(2^n-1)$ levels during a plurality of said fields in response to the (n−1)-bit digital data output from said A/D conversion means when the level of said data control signal assumes both said first level and said second level; and means coupled to said generating means for driving said liquid crystal display panel in accordance with said gradation signal.

6. The image display apparatus according to claim 5, wherein said data control means includes logic means coupled to said converting means, for receiving said n-bit digital data and said data control signal, and including means for outputting the upper (n−1) bits of said n-bit digital data when the level of said data control signal is at either of said first or said second level and a least significant bit of said n-bit digital data is "O", the upper (n−1) bits of said n-bit digital data when the level of said data control signal is at said first level and the least significant bit of said n-bit digital data is "1", and the upper (n−1) bits obtained by adding "1" to the (n−1)th bit or to the n-th bit when the level of said data control signal is at said second level and the least significant bit of said n-bit digital data is "1".

7. The image display apparatus according to claim 6, wherein said outputting means outputs the upper (n−1) bits of said n-bit digital data when the level of said data control signal is at either of said first or said second level and each of said n-bit data is "1".

8. The image display apparatus according to claim 5, wherein said A/D conversion means includes a reference voltage source for converting the video signal, and means for switching the level of said reference voltage source in accordance with the first and the second levels of said data control signal.

* * * * *